(12) United States Patent
Yoshizawa et al.

(10) Patent No.: US 10,894,387 B2
(45) Date of Patent: Jan. 19, 2021

(54) SLIDING PART WITH WEAR RESISTANT COATING AND METHOD OF FORMING WEAR RESISTANT COATING

(71) Applicant: IHI Corporation, Koto-ku (JP)

(72) Inventors: Hiroki Yoshizawa, Tokyo (JP); Mitsutoshi Watanabe, Tokyo (JP); Yukihiro Shimoda, Tokyo (JP)

(73) Assignee: IHI Corporation, Koto-ku (JP)

( * ) Notice: Subject to any disclaimer, the term of this patent is extended or adjusted under 35 U.S.C. 154(b) by 60 days.

(21) Appl. No.: 15/893,916

(22) Filed: Feb. 12, 2018

(65) Prior Publication Data

US 2018/0170004 A1    Jun. 21, 2018

Related U.S. Application Data

(63) Continuation of application No. PCT/JP2016/073956, filed on Aug. 17, 2016.

(30) Foreign Application Priority Data

Dec. 1, 2015   (JP) .................................. 2015-234514

(51) Int. Cl.
*B22F 7/00* (2006.01)
*B32B 15/01* (2006.01)
(Continued)

(52) U.S. Cl.
CPC ................ *B32B 15/01* (2013.01); *B22F 7/06* (2013.01); *B23K 26/14* (2013.01); *B23K 26/144* (2015.10);
(Continued)

(58) Field of Classification Search
None
See application file for complete search history.

(56) References Cited

U.S. PATENT DOCUMENTS 6,467,272 B1 * 10/2002 Biondo ................... F23D 14/48
60/733
2007/0099027 A1    5/2007 Krishnamurthy et al.
(Continued)

FOREIGN PATENT DOCUMENTS

CN         101495677 A     7/2009
CN         102732817 A    10/2012
(Continued)

OTHER PUBLICATIONS

Extended European Search Report dated Jul. 24, 2019 in European Patent Application No. 16870233.0, 7 pages.
(Continued)

*Primary Examiner* — Seth Dumbris
(74) *Attorney, Agent, or Firm* — Oblon, McClelland, Maier & Neustadt, L.L.P.

(57) ABSTRACT

A sliding part with a wear resistant coating includes a sliding part, and a wear resistant coating provided on a sliding surface of the sliding part, and made of a cobalt alloy containing chromium and silicon. In the wear resistant coating, oxide particles are dispersed which include an oxide containing chromium and silicon, and have a particle size of 100 μm or less when a cross section of the wear resistant coating is observed using an optical microscope with a magnification of 100 times.

10 Claims, 7 Drawing Sheets

(51) Int. Cl.
*C22C 19/07* (2006.01)
*B23K 26/342* (2014.01)
*B23K 26/14* (2014.01)
*C22C 32/00* (2006.01)
*B23K 26/144* (2014.01)
*B22F 7/06* (2006.01)
*B23K 35/30* (2006.01)
*F01D 25/00* (2006.01)
*C23C 24/10* (2006.01)
*F01D 5/28* (2006.01)

(52) U.S. Cl.
CPC ........ *B23K 26/342* (2015.10); *B23K 35/3046* (2013.01); *C22C 19/07* (2013.01); *C22C 32/001* (2013.01); *C23C 24/106* (2013.01); *F01D 5/288* (2013.01); *F01D 25/005* (2013.01); *B32B 2307/536* (2013.01); *B32B 2603/00* (2013.01); *F05D 2300/132* (2013.01); *F05D 2300/506* (2013.01); *F05D 2300/611* (2013.01); *Y10T 428/12056* (2015.01)

(56) References Cited

U.S. PATENT DOCUMENTS

| | | | |
|---|---|---|---|
| 2008/0083391 A1 | 4/2008 | Sawada et al. | |
| 2009/0297720 A1* | 12/2009 | Ramgopal | C23C 4/06 427/455 |
| 2010/0016185 A1 | 1/2010 | Goto et al. | |
| 2012/0258253 A1 | 10/2012 | Helmick et al. | |
| 2012/0321478 A1 | 12/2012 | Oikawa et al. | |
| 2015/0093566 A1* | 4/2015 | Bell | E21B 17/1085 428/323 |

FOREIGN PATENT DOCUMENTS

| | | |
|---|---|---|
| JP | 57-185946 | 11/1982 |
| JP | 61-276771 | 12/1986 |
| JP | 02-092495 | 4/1990 |
| JP | 04-013897 | 1/1992 |
| JP | 05-052263 | 3/1993 |
| JP | 6-235096 A | 8/1994 |
| JP | 2003-001344 | 1/2003 |
| JP | 2005-214054 | 8/2005 |
| JP | 2008-138242 | 6/2008 |
| JP | 2008-264842 | 11/2008 |
| JP | 2012-219375 | 11/2012 |
| JP | 2013-001949 | 1/2013 |
| WO | WO 2007/113914 A1 | 10/2007 |
| WO | WO 2015/068227 A1 | 5/2015 |

OTHER PUBLICATIONS

International Search Report dated Sep. 20, 2016 in PCT/JP2016/073956 filed Aug. 17, 2016 (with English Translation).

Written Opinion dated Sep. 20, 2016 in PCT/JP2016/073956 filed Aug. 17, 2016.

* cited by examiner

OXIDE PARTICLES

SLIDING PART WITH WEAR RESISTANT COATING AND METHOD OF FORMING WEAR RESISTANT COATING

CROSS REFERENCE TO RELATED APPLICATIONS

This application is a continuation application of International Application No. PCT/JP2016/073956, filed on Aug. 17, 2016, which claims priority to Japanese Patent Application No. 2015-234514, filed on Dec. 1, 2015, the entire contents of which are incorporated by references herein.

BACKGROUND

1. Field

The present disclosure relates to a sliding part with a wear resistant coating, and a method of forming a wear resistant coating.

2. Description of the Related Art

A conventional method of forming a wear resistant coating provided on a sliding surface of a sliding part such as a turbine blade is performed by overlaying the sliding surface with a cobalt (Co) based alloy, using TIG welding or the like. Japanese Patent Application Publication No. 2013-1949 (Patent Literature 1) discloses a steam turbine long blade in which a Co based alloy named Stellite is joined to a blade tip portion using TIG welding.

SUMMARY

In a case of a wear resistant coating formed by overlay welding with a cobalt alloy such as a Stellite alloy using TIG welding, a lubricious oxide, which is selectively oxidized chromium and the like contained in the cobalt alloy, is formed on the coating surface to enhance the wear resistance. However, when the sliding part is exposed to heat in a temperature range not higher than approximately 600° C., selective oxidization of chromium and the like contained in the cobalt alloy such as a Stellite alloy hardly occurs, and no lubricious oxide is formed on the coating surface, which may result in an increase in an amount of wear of the sliding part.

With this taken into consideration, an object of the present disclosure is to provide a sliding part with a wear resistant coating which is capable of enhancing the wear resistance even in the temperature range not higher than approximately 600° C., and a method of forming the wear resistant coating.

A sliding part with a wear resistant coating according to an embodiment of the present disclosure includes a sliding part, and a wear resistant coating provided on a sliding surface of the sliding part, and made of a cobalt alloy containing chromium and silicon, in which oxide particles are dispersed in the wear resistant coating, the oxide particles including an oxide which contains chromium and silicon, and having a particle size of 100 μm or less when a cross section of the wear resistant coating is observed using an optical microscope with a magnification of 100 times.

In the sliding part with a wear resistant coating according to an embodiment of the present disclosure, when a 300 μm×300 μm area in the cross section of the wear resistant coating is observed using the optical microscope with the magnification of 100 times, 10 or more oxide particles with a particle size of 10 μm or less are present therein.

In the sliding part with a wear resistant coating according to an embodiment of the present disclosure, a Vickers hardness of the wear resistant coating is HV280 or greater.

In the sliding part with a wear resistant coating according to an embodiment of the present disclosure, the cobalt alloy contains 8.5% by mass or more but 32.5% by mass or less of chromium.

In the sliding part with a wear resistant coating according to an embodiment of the present disclosure, the sliding part is a gas turbine part.

A method of forming a wear resistant coating according to an embodiment of the present disclosure includes a step of forming a wear resistant coating on a sliding surface of a sliding part by laser overlaying with an overlay material while supplying a shield gas, in which the overlay material is powder of a cobalt alloy containing chromium and silicon, and passing through 150 mesh.

In the method of forming a wear resistant coating according to an embodiment of the present disclosure, the overlay material is powder of the cobalt alloy, and passing through 425 mesh.

In the method of forming a wear resistant coating according to an embodiment of the present disclosure, the overlay material further includes granulated powder obtained by granulating powder of the cobalt alloy containing chromium and silicon, where an average particle size of the powder is 1.5 μm or less is when measured using a laser diffraction scattering method.

According to the foregoing configuration, the wear resistant coating in which the oxide particles including the oxide which contains chromium and silicon, and having the particle size of 100 μm or less are dispersed is obtained. For this reason, the wear resistance can be enhanced even in the temperature range not higher than approximately 600° C.

DESCRIPTION OF EMBODIMENTS

Figure 1:
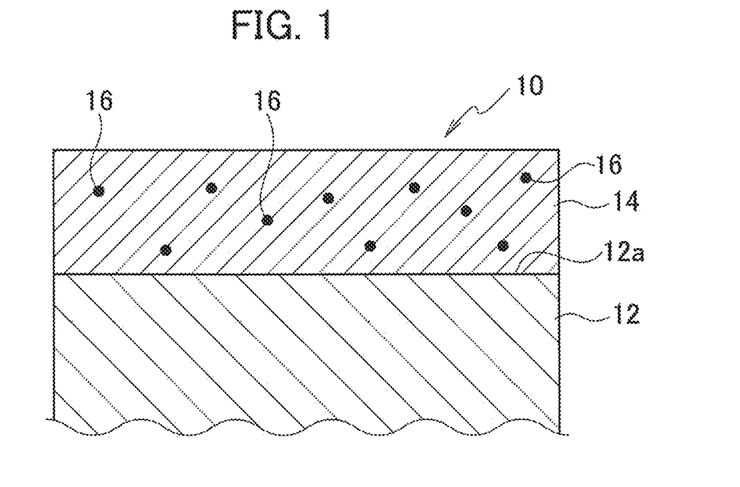
FIG. 1 is a cross-sectional view illustrating a configuration of a sliding part with a wear resistant coating in an embodiment of the present disclosure.

Using the drawings, detailed descriptions will be hereinbelow provided for an embodiment of the present disclosure. FIG. 1 is a cross-sectional view illustrating a configuration of a sliding part 10 with a wear resistant coating. The sliding part 10 with the wear resistant coating includes a sliding part 12, and a wear resistant coating 14 provided on a sliding surface 12a of the sliding part 12.

The sliding part 12 is a gas turbine part, and for example, a part used at high temperature, such as an aircraft jet engine part, a vehicle turbocharger or supercharger part, and an industrial gas turbine part. An example of the aircraft jet engine part is a turbine blade which slides over a shroud. The sliding part 12 is made of a Ni based alloy or the like, for example. Fretting wear, impact wear, and the like, for example, occur on the sliding surface 12a of the sliding part 12. In this respect, fretting wear is caused by minute and repetitive slides with surface pressure applied to the sliding surface 12a, and impact wear is caused by periodically repetitive pressure and slides.

The wear resistant coating 14 is provided on the sliding surface 12a of the sliding part 12. The wear resistant coating 14 is made of a cobalt alloy which contains cobalt (Co) as the main component, as well as chromium (Cr) and silicon (Si). The main component in the alloy means an alloy component which has the largest proportion in the alloy. Since the wear resistant coating 14 is made of the cobalt alloy whose main component is cobalt, the wear resistant coating 14 has heat resistant. Since the cobalt alloy contains chromium and silicon, when the wear resistant coating 14 is exposed to an oxidizing atmosphere with a temperature higher than approximately 600° C., chromium and silicon are selectively oxidized so that chromium oxide and silicon oxide are accordingly formed in the surface of the wear resistant coating 14. In the temperature range higher than approximately 600° C., these lubricious oxides formed in the surface of the wear resistant coating 14 enhances the wear resistance of the wear resistant coating 14. The film thickness of the wear resistant coating 14 is, for example, between 100 μm and 1000 μm, inclusive.

The cobalt alloy may contain 8.5% by mass or more but 32.5% by mass or less of chromium in order to enhance heat resistance, oxidization resistance, and wear resistance. A Stellite alloy and a Tribaloy alloy may be used as such a cobalt alloy. The Stellite alloy is a cobalt alloy which contains Cr, Si, W, C, and the like, and the rest of which are Co and inevitable impurities. The Stellite alloy, for example, contains cobalt as its main component, as well as 20% by mass or more but 32.5% by mass or less of chromium and 2.0% by mass or less of silicon. For this reason, the Stellite alloy is good at heat resistance and oxidization resistance. The Stellite alloy is hard and good at wear resistance since fine carbide such as WC is dispersed therein. A Stellite 31 alloy or the like, for example, may be used as the Stellite alloy. The Tribaloy alloy is a cobalt alloy which contains Cr, Si, Mo and the like, and the rest of which are Co and inevitable impurities. The Tribaloy alloy, for example, contains cobalt as its main component, as well as 8.5% by mass or more but 18% by mass or less of chromium and 1.3% by mass or more but 3.7% by mass or less of silicon. For this reason, the Tribaloy alloy is good at heat resistance and oxidization resistance. The Tribaloy alloy is hard and good at wear resistance since fine intermetallic compound of Mo and Si is dispersed therein. A Tribaloy T-400 alloy, a Tribaloy T-800 alloy, and the like may be used as the Tribaloy alloy.

The wear resistant coating 14 is made by dispersing therein oxide particles 16 including an oxide which contains chromium and silicon, and having a particle size of 100 μm or less when the cross section of the wear resistant coating 14 is observed using an optical microscope with a magnification of 100 times. Each oxide particle 16 is made of the oxide containing chromium and silicon as its main components (such as a complex oxide of chromium oxide and silicon oxide), and is good at lubricity. In this respect, the main components in the oxide are components which are contained in the oxide in large amounts. The oxide particles 16 are formed dispersed in the surface of the wear resistant coating 14, and in the thickness direction of the wear resistant coating 14. Since the oxide particles 16 including the oxide which contains chromium and silicon are dispersed in the wear resistant coating, the wear resistance of the wear resistant coating can be enhanced even in a temperature range not higher than approximately 600° C. where chromium and silicon are less likely to be selectively oxidized into the oxide.

The oxide particles 16 are made of particles having the particle size of 100 μm or less when the cross section of the wear resistant coating 14 is observed using an optical microscope with the magnification of 100 times. The oxide particles 16 may include no particles with a particle size of over 100 μm, and be made of only particles having a particle size of 100 μm or less when the cross section of the wear resistant coating 14 is observed using an optical microscope with the magnification of 100 times. In addition, the oxide particles 16 are approximately spherical in shape. A reason why the particle size of the oxide particles 16 is 100 μm or less is that the particle size of over 100 μm decreases the number of oxide particles 16 in the wear resistant coating, whereby the number of oxide particles 16 to be supplied to the sliding surface 12a is reduced. Furthermore, another reason is that in the case where a Stellite alloy is used as the cobalt alloy, the small silicon content is more likely to decrease the concentration of silicon in the oxide particles 16 to be made by selectively oxidizing chromium and silicon contained in the cobalt alloy using a below-discussed laser overlaying method if the particle size of the oxide particles 16 is over 100 μm. Since the particle size of 100 μm or less for the oxide particles 16 makes it possible to disperse more oxide particles 16 in the wear resistant coating, more oxide particles 16 can be supplied to the sliding surface 12a of the sliding part 12.

10 or more oxide particles 16 with a particle size of 10 μm or less may be present in a 300 μm×300 μm area in the cross-section of the wear resistant coating when observing the area using an optical microscope with the magnification of 100 times. The dispersion of many fine oxide particles 16 with the particle size of 10 μm or less in the wear resistant coating makes it possible to supply more numbers of the oxide particles 16 to the sliding surface 12a of the sliding part 12.

The Vickers hardness of the wear resistant coating 14 may be at HV280 or more. When the wear resistant coating 14 is made of a hard film whose Vickers hardness is at HV280 or more, the wear resistant coating 14 can have an enhanced wear resistance. The Vickers hardness of the wear resistant coating 14 may be between HV280 and HV1100, inclusive.

Next, descriptions will be provided for a method of forming the wear resistant coating 14.

Figure 2:
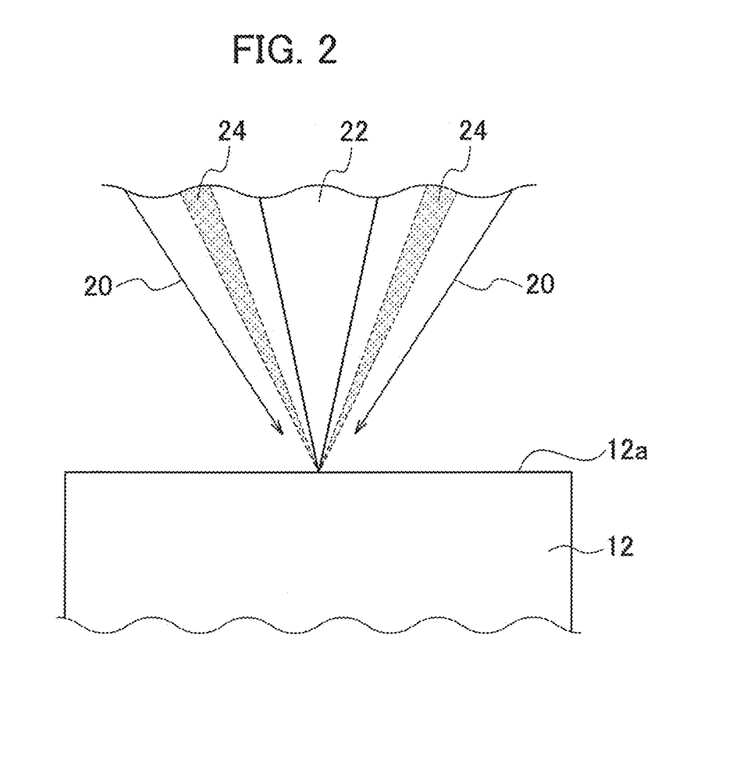
FIG. 2 is a diagram for explaining a method of forming the wear resistant coating in the embodiment of the present disclosure.

FIG. 2 is a diagram for explaining the method of forming the wear resistant coating 14. The method of forming the wear resistant coating 14 includes a step of forming the wear resistant coating 14 by overlaying the sliding surface 12a of the sliding part 12 with an overlay material 24 by irradiating a laser beam 22 onto the sliding surface 12a while supplying a shielding gas 20.

Cobalt alloy powder containing chromium and silicon, and passing through 150 mesh may be used as the overlay material 24. Since the cobalt alloy powder has a larger specific surface area than that of a welding rod used for TIG welding, the powder surface adsorbs more oxygen. In the case of the cobalt alloy powder passing through 150 mesh, for example, the 90% cumulative diameter (D90) in the cumulative particle size distribution (on a volume basis) measured using a laser diffraction scattering method is as small as 100 μm or less, and the amount of oxygen adsorbed to the powder surface is large. During the laser overlaying, the oxygen adsorbed to the surface of the cobalt alloy powder selectively oxidizes chromium and silicon contained in the cobalt alloy powder, and accordingly forms the oxide particles 16 including the oxide containing chromium and silicon. Furthermore, the use of the cobalt alloy powder passing through 150 mesh with the small particle size makes it possible to form and disperse in the wear resistant coating 14 the oxide particles 16 with the particle size of 100 μm or less when the cross section of the wear resistant coating 14 is observed using an optical microscope with the magnification of 100 times.

Cobalt alloy powder made of a Stellite alloy or a Tribaloy alloy may be used as the overlay material 24. The cobalt alloy powder formed using a gas atomization method or a water atomization method, for example, may be used as the overlay material 24. The overlay material 24 is formed by sieving, etc., the cobalt alloy powder with the 150 mesh (with a sieve opening of 106 μm).

Cobalt alloy powder containing chromium and silicon, and passing through 425 mesh may be used as the overlay material 24. In the case of the cobalt alloy powder passing through 425 mesh, for example, the 90% cumulative diameter (D90) in the cumulative particle size distribution (on a volume basis) measured using the laser diffraction scattering method is 32 μm or less. The use of the cobalt alloy powder with the much smaller particle size makes the surface area of the cobalt alloy powder larger, and accordingly increases the amount of oxygen adsorbed to the powder surface. This makes it possible to form the oxide particles 16 while supplying more oxygen during the laser overlaying. The overlay material 24 is formed by sieving, etc., the cobalt alloy powder with the 425 mesh (with a sieve opening of 32 μm).

The overlay material 24 may include granulated powder obtained by granulating cobalt alloy powder which contains chromium and silicon, and whose average particle size, as measured by the laser diffraction scattering method, is 1.5 μm or less, in addition to the cobalt alloy powder containing chromium and silicon, and passing through 425 mesh. The use of the granulated powder obtained by granulating the cobalt alloy fine powder with the average particle size of 1.5 μm or less makes it possible to increase the amount of oxygen adsorbed to the powder surface much more, and to accordingly supply much more oxygen during the laser overlaying. Moreover, during the laser overlaying, a too small particle size of the cobalt alloy powder worsens the flowability of the cobalt alloy powder, and makes it difficult to stably supply the cobalt alloy powder. In contrast, the use of the granulated powder makes it possible to stably supply the cobalt alloy powder during the laser overlaying.

The granulated powder can be made, for example, as follows. To begin with, coarse grains of the cobalt alloy powder are pulverized using a jet mill or the like. The resultant cobalt alloy powder shaped like a scale or the like with an average particle size of 1.5 μm or less is collected. A swirling flow jet mill or the like may be used as the jet mill. The cobalt alloy powder with the average particle size of 1.5 μm or less, a binder, and a solvent are mixed by stirring, whereby slurry is made. This slurry is granulated using a spray dryer, whereby the granulated powder is formed. The particle size of the granulate powder is, for example, between 30 μm and 40 μm, inclusive. The ratio of the cobalt alloy powder passing through 425 mesh to the granulated powder may be 6:1 on a volume-ratio basis. These types of powder may be mixed before the laser overlaying, or during the laser overlying.

Next, descriptions will be provided for a laser overlaying method. The laser overlaying is achieved by irradiating the laser beam 22 onto the sliding surface 12a of the sliding part 12 while supplying the shielding gas 20, supplying the overlay material 24 to an irradiation area of the laser beam 22, and melting the overlay material 24 with the laser beam 22. Thereby, the wear resistant coating 14 made of the cobalt alloy containing chromium and silicon is formed on the sliding surface 12a of the sliding part 12. Since oxygen is adsorbed to the surface of the cobalt alloy powder as the overlay material 24, during the laser overlaying, chromium and silicon contained in the cobalt alloy are selectively oxidized, and the oxide particles 16 including the oxide containing chromium and silicon is dispersively formed in the wear resistant coating. Meanwhile, since the laser overlaying is performed while supplying the shielding gas 20, oxidation of the sliding surface 12a and the like of the sliding part 12 is inhibited. An argon gas or the like may be used as the shielding gas 20. Furthermore, since the laser overlaying has a smaller amount of inputted heat, thermal effect on the sliding part 12 can be inhibited. As the laser overlaying device, a known laser overlaying device such as a laser overlaying system made by TRUMPF may be used.

In the thus-configured the sliding part with the wear resistant coating can enhance the wear resistance even in the temperature range not higher than approximately 600° C. since the wear resistant coating is made of the cobalt alloy containing chromium and silicon, and the oxide particles including the oxide which contains chromium and silicon, and having the particle size of 100 μm or less when the cross section of the wear resistant coating is observed using an optical microscope with the magnification of 100 times, are dispersed in the wear resistant coating.

In the thus-configured method of forming the wear resistant coating, the cobalt alloy powder containing chromium and silicon, and passing through 150 mesh, is used as the overlay material to form the wear resistant coating by laser overlaying. For this reason, it is possible to easily form and disperse in the wear resistant coating the oxide particles including the oxide which contains chromium and silicon, and having the particle size of 100 μm or less when the cross section of the wear resistant coating is observed using an optical microscope with the magnification of 100 times.

Examples

Wear resistant coatings were formed using forming methods of Examples 1 to 3, and were evaluated. To begin with, descriptions will be provided for the methods of forming the respective wear resistant coatings.

In each of the forming methods of Examples 1 to 3, a wear resistant coating was formed on the surface of a substrate by overlaying the surface with powder of the Stellite 31 alloy, as the overlay material, using a laser overlaying method. As for its composition on a mass-ratio basis, the Stellite 31 alloy contained 10.5% of Ni, 2% or less of Fe, 0.5% of C, 25.5% of Cr, 1% of Mn, 1.0% of Si and 7.5% of W, and the rest were Co and inevitable impurities. Inconel 718, which is a Ni based alloy, was used for the substrate.

In the forming method of Example 1, powder of the Stellite 31 alloy passing through 150 mesh was used as the overlay material. In this overlay material, the 90% cumulative diameter (D90) in the cumulative particle size distribution (on a volume basis) measured using the laser diffraction scattering method was 100 μm.

In the forming method of Example 2, powder of the Stellite 31 alloy passing through 425 mesh was used as the overlay material. In this overlay material, the 90% cumulative diameter (D90) in the cumulative particle size distribution (on a volume basis) measured using the laser diffraction scattering method was 32 μm.

In the forming method of Example 3, powder of the Stellite 31 alloy passing through 425 mesh, and granulated powder obtained by granulating powder of the Stellite 31 alloy with an average particle size of 1.5 μm or less which was measured using the laser diffraction scattering method were used as the overlay material. The granulated powder was made as follows. First of all, coarse grains of the powder of the Stellite 31 alloy were pulverized using the swirling flow jet mill. Scale-shaped powder of the Stellite 31 alloy with the average particle size of 1.5 μm or less was collected. The powder of the Stellite 31 alloy with the average particle size of 1.5 μm or less, a binder, and water were mixed by stirring, whereby slurry was made. This slurry was granulated using a spray dryer, whereby the granulated powder was made. During the laser overlaying, the powder of the Stellite 31 alloy passing through 425 mesh, and the granulated powder were supplied by being mixed at a ratio of 6:1 in a volume ratio.

The laser overlaying was performed using the laser overlaying system manufactured by TRUMPF. This laser overlaying system included a YAG laser oscillator with a laser output of 2 kW, and a powder feeder. As for the conditions for the laser overlaying, the laser output was set at 0.45 kW, the powder feeding rate was set at approximately 6 g/minute, the spot diameter was set at 3 mm, and the welding speed was set at 1000 mm/minute. An argon gas was used as the shielding gas.

Figure 3:
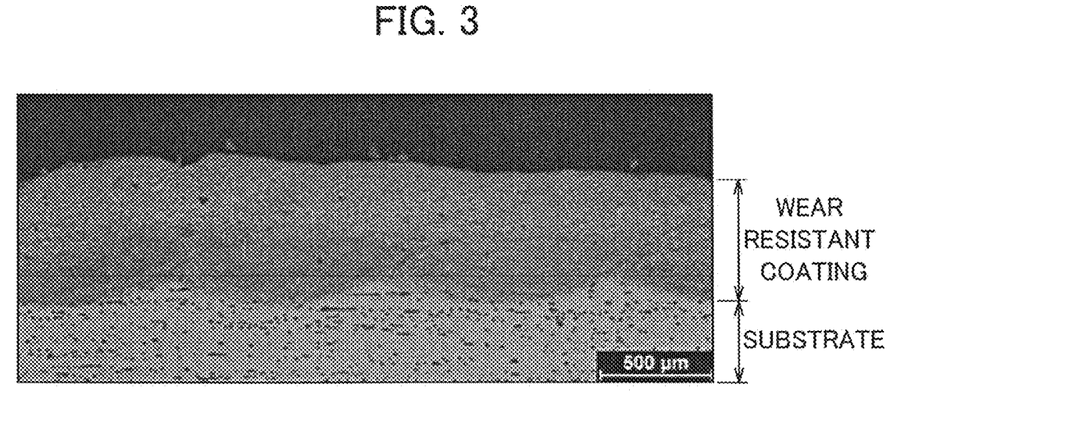
FIG. 3 is a photograph showing a result of observing a cross section of the wear resistant coating formed using a forming method of Example 1 in the embodiment of the present disclosure.
Figure 4:
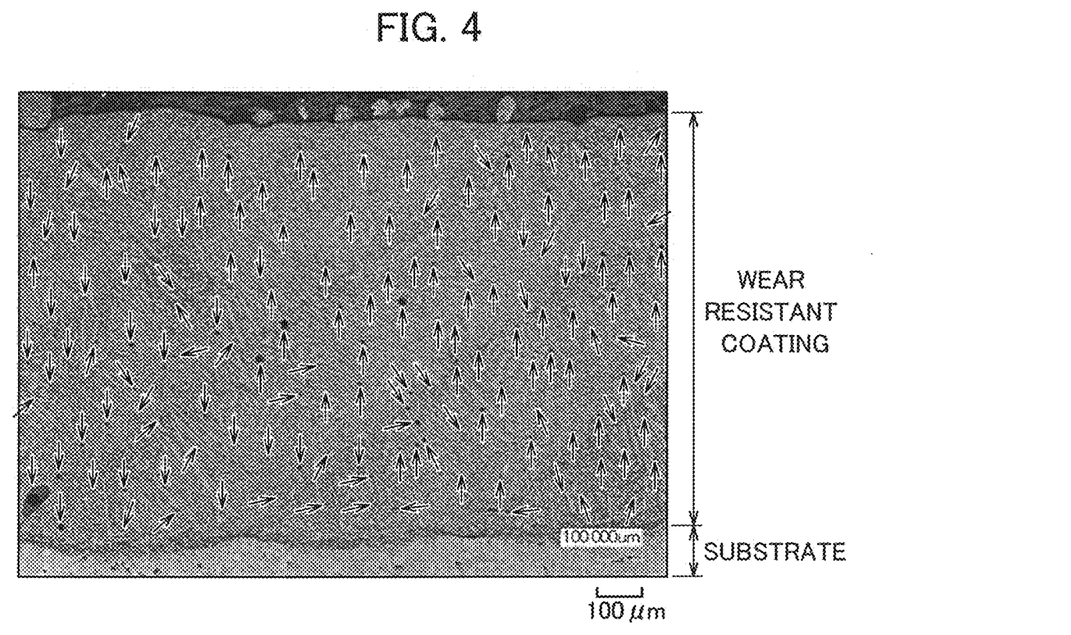
FIG. 4 is a magnified photograph showing the result of observing the cross section of the wear resistant coating formed using the forming method of Example 1 in the embodiment of the present disclosure.
Figure 5:
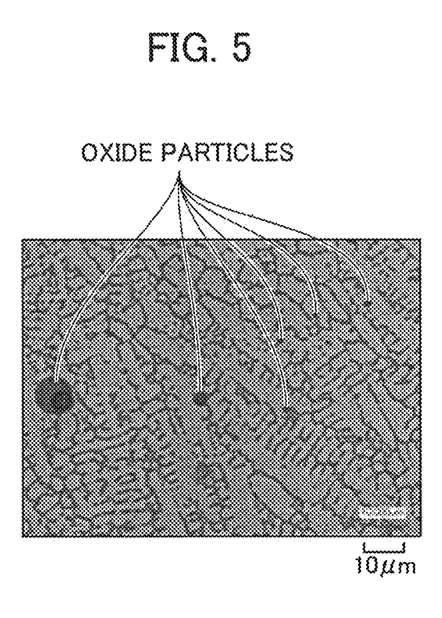
FIG. 5 is a magnified photograph showing a result of observing a cross section of an oxide particle-containing area in the wear resistant coating formed using the forming method of Example 1 in the embodiment of the present disclosure.

Each overlay material was put on the corresponding substrate using the layer overlaying method. Thereafter, observation of the cross section of the wear resistant coating and qualitative analysis on the wear resistant coating were performed. FIG. 3 is a photograph showing a result of observing the cross section of the wear resistant coating formed using the forming method of Example 1. FIG. 4 is a magnified photograph showing the result of observing the cross section of the wear resistant coating formed using the forming method of Example 1. Incidentally, in FIG. 4, arrows point oxide particles (black particles). FIG. 5 is a magnified photograph showing a result of observing a cross section of an oxide particle-containing area in the wear resistant coating formed using the forming method of Example 1. Incidentally, FIGS. 3 to 5 show the results of the observations made using an optical microscope. FIG. 3 shows the result of the observation made using the microscope with a magnification of 50 times. FIG. 4 shows the result of the observation made using the microscope with a magnification of 100 times. FIG. 5 shows the result of the observation made using the microscope with a magnification of 500 times.

From the photograph in FIG. 3, the wear resistant coating was observed to be formed on the surface of the substrate. The film thickness of the wear resistant coating was approximately 500 μm. No cracks, delamination, or the like was observed in the wear resistant coating, or in the interface between the surface of the substrate and the wear resistant coating.

From the magnified photograph in FIG. 4, oxide particles (black particles pointed by arrows) were observed to be dispersed in the wear resistant coating, where the particle size was 100 μm or less when the cross section of the wear resistant coating was observed using an optical microscope with the magnification of 100 times. The oxide particles included no particles with a particle size of over 100 μm, and were made of only particles with a particle size of 100 μm or less. Most of the oxide particles were 10 μm or less in particle size. In addition, when a 300 μm×300 μm area in the cross section of the wear resistant coating was observed using an optical microscope with the magnification of 100 times, 10 or more oxide particles with a particle size of 10 μm or less were observed to be present there. Incidentally, oxide particles with a particle size of over 10 μm were observed to be near the surface of substrate.

The magnified photograph in FIG. 5 shows that the oxide particles had an approximately circular shape when the cross section of the wear resistant coating was observed using the optical microscope. From this, one may consider that the shape of the oxide particles is approximately spherical.

Figure 6A:
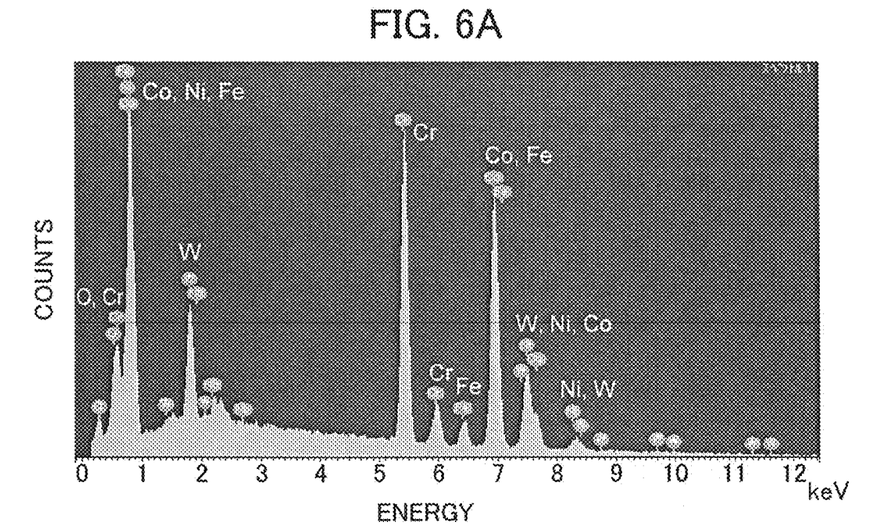
FIG. 6A is a graph showing a result of qualitative analysis on an area with no oxide particle in the wear resistant coating formed using the forming method of Example 1 in the embodiment of the present disclosure.
Figure 6B:
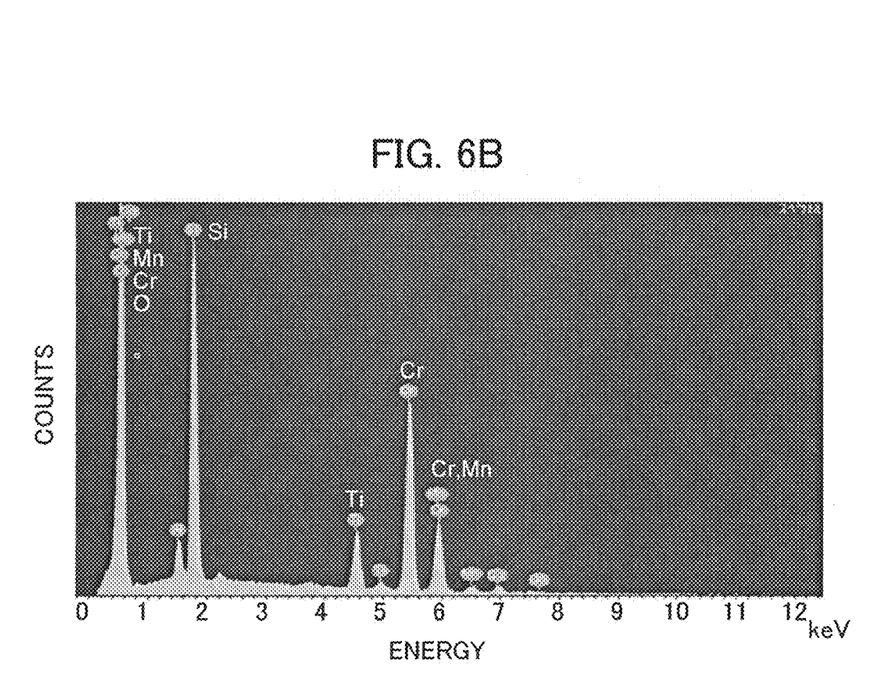
FIG. 6B is a graph showing a result of qualitative analysis on oxide particles in the wear resistant coating formed using the forming method of Example 1 in the embodiment of the present disclosure.

FIG. 6A is a graph showing a result of qualitative analysis on an area with no oxide particle in the wear resistant coating formed using the forming method of Example 1. FIG. 6B is a graph showing a result of qualitative analysis on oxide particles in the wear resistant coating formed using the forming method of Example 1. The qualitative analysis was performed using an energy dispersive X-ray fluorescence spectrometry (EDX).

As shown in FIG. 6A, in the area with no oxide particle, components, mainly such as Co, Cr, W and Ni, of the Stellite 31 alloy were observed to have peaks. Furthermore, in the area with no oxide particle, components of Inconel 718 were observed to have slight peaks.

As shown in FIG. 6B, in the oxide particles, mainly Cr, Si and O were observed to have peaks. From this, it was learned that the oxide particles mainly included the oxide containing chromium and silicon which was formed by selectively oxidizing Cr and Si as components of the Stellite 31 alloy. Furthermore, Ti contained in Inconel 718 was also observed to have slight peaks. From this, it was learned that the oxide particles included a titanium oxide formed by selectively oxidizing Ti.

Figure 7:
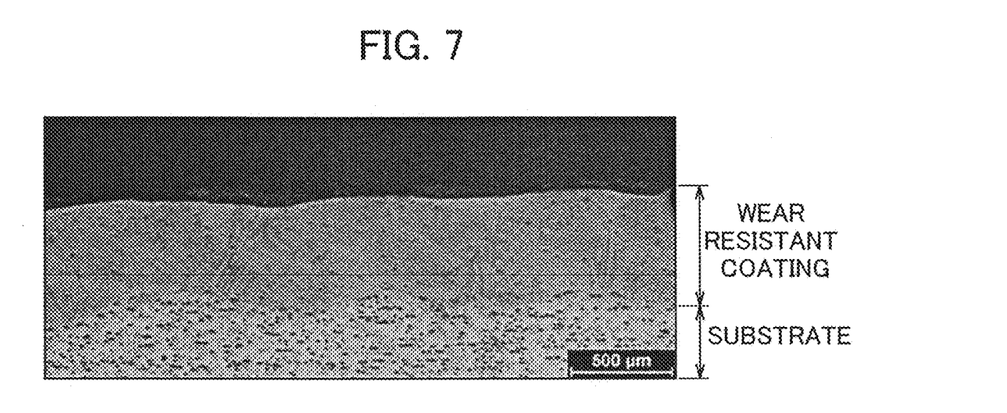
FIG. 7 is a photograph showing a result of observing a cross section of the wear resistant coating formed using a forming method of Example 2 in the embodiment of the present disclosure.
Figure 8:
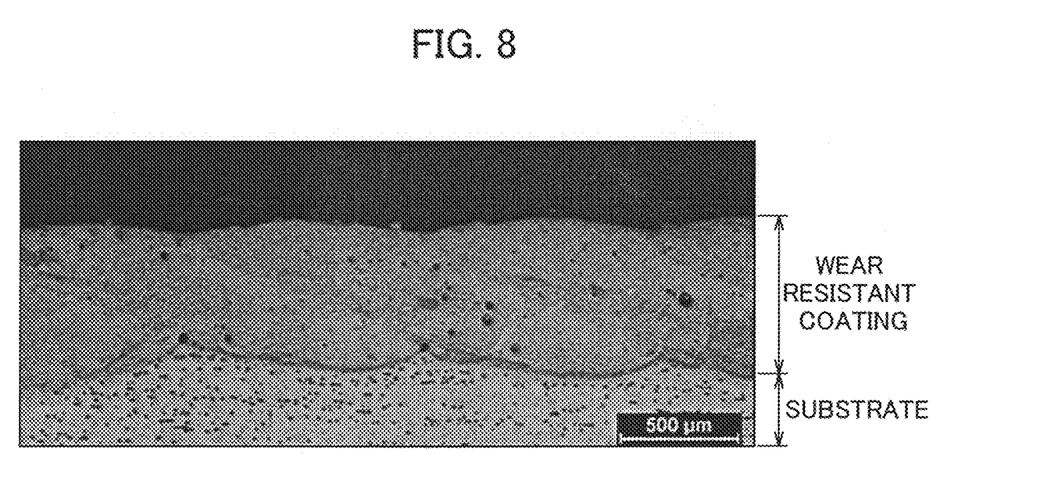
FIG. 8 is a photograph showing a result of observing a cross section of the wear resistant coating formed using a forming method of Example 3 in the embodiment of the present disclosure.
Figure 9:
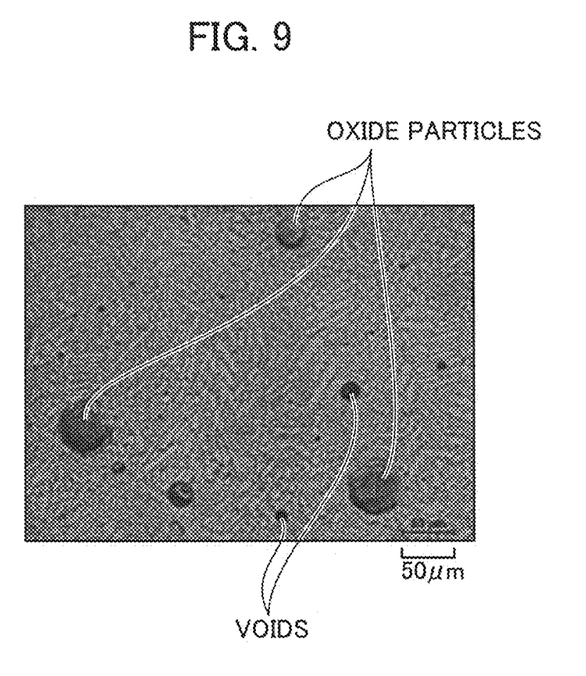
FIG. 9 is a magnified photograph showing the result of observing the cross section of the wear resistant coating formed using the forming method of Example 3 in the embodiment of the present disclosure.

FIG. 7 is a photograph showing a result of observing the cross section of the wear resistant coating formed using the forming method of Example 2. FIG. 8 is a photograph showing a result of observing the cross section of the wear resistant coating formed using the forming method of Example 3. FIG. 9 is a magnified photograph showing the result of observing the cross section of the wear resistant coating formed using the forming method of Example 3. Incidentally, FIGS. 7 to 9 show the results of the observations made using an optical microscope. FIG. 7 shows the result of the observation made using the microscope with a magnification of 50 times. FIG. 8 shows the result of the observation made using the microscope with a magnification of 50 times. FIG. 9 shows the result of the observation made using the microscope with a magnification of 200 times.

From the photographs in FIGS. 7 and 8, the wear resistant coating was observed to be formed on the surface of the substrate. The film thickness of the wear resistant coating was approximately 500 μm. No cracks, delamination, or the like was observed in the wear resistant coating, or in the interface between the surface of the substrate and the wear resistant coating.

As for the wear resistant coatings formed using the forming methods of Examples 2 and 3, likewise the wear resistant coating formed using the forming method of Example 1, oxide particles were observed to be dispersed in the wear resistant coatings, where the particle size of the oxide particles was 100 μm or less when the cross sections of the wear resistant coatings were observed using the optical microscope with the magnification of 100 times. The oxide particles included no particles with a particle size of over 100 μm, and were made of only particles with a particle size of 100 μm or less. Most of the oxide particles were 10 μm or less in particle size. In addition, when a 300 μm×300 μm area in the cross section of each wear resistant coating was observed using an optical microscope with the magnification of 100 times, 10 or more oxide particles with a particle size of 10 μm or less were observed therein.

As for the wear resistant coating formed using the forming method of Example 3, as shown in the photograph in FIG. 9, fine voids were observed to be present in the wear resistant coating. Furthermore, oxide particles filled in voids were observed. One may consider that the voids were formed due to things such as a carbon dioxide gas generated by reaction between oxygen adsorbed to the powder of the Stellite 31 alloy and carbon which was a component of the powder of the Stellite 31 alloy.

Thereafter, for each of the wear resistant coatings formed using the forming methods of Examples 1 to 3, the hardness was measured using the Vickers hardness test method. The Vickers hardness test method was performed in room temperature by applying a load of 1 kg to a center portion of the cross section of the wear resistant coating, and measuring the hardness of the wear resistant coating at five portions. Thereafter, these hardness values were averaged to obtain the hardness of each wear resistant coating. The average hardness of each of the wear resistant coatings formed using the forming methods of Examples 1 and 2 was not less than HV350. The average hardness of the wear resistant coating formed using the forming method of Example 3 was not less than HV280 but not greater than HV310. The average hardness of each of the wear resistant coatings formed using the forming methods of Examples 1 and 2 was higher than that of the wear resistant coating formed using the forming method of Example 3.

The Stellite 31 alloy increased the hardness by dispersing fine carbide. Since the forming method of Example 3 supplied more oxygen to the atmosphere during the laser overlaying than the forming methods of Examples 1 and 2, such oxygen reacted with carbon which was a component of the Stellite 31 alloy, and more carbon was accordingly consumed. One may consider that this made the average hardness of the wear resistant coating formed using the forming method of Example 3 slightly lower than that of each of the wear resistant coatings formed using the forming methods of Examples 1 and 2.

Figure 10:
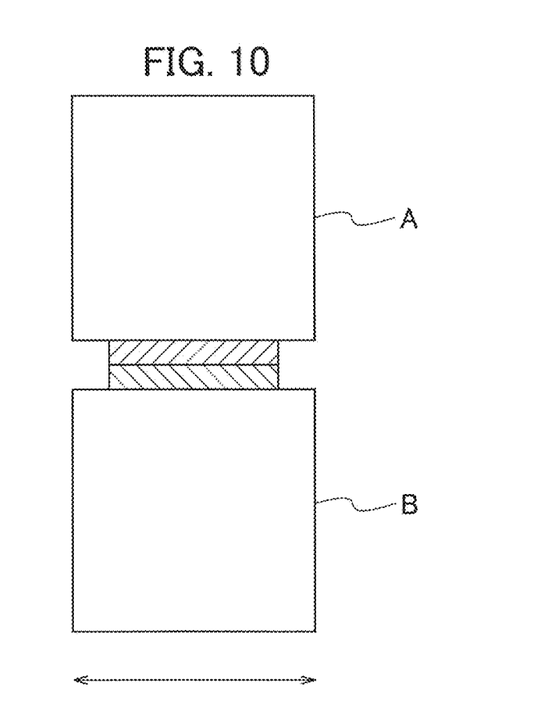
FIG. 10 is a diagram for explaining a fretting wear test in the embodiment of the present disclosure.

Next, for each of the wear resistant coatings formed using the forming methods of Examples 1 to 3, the fretting wear test was performed to evaluate the wear resistance. FIG. 10 is a diagram for explaining the fretting wear test. The fretting wear test was achieved by forming an overlay layer on the sliding surface of an upper jig A, forming a wear resistant coating on the sliding surface of a lower jig B, putting the sliding surfaces of the upper and lower jigs A and B opposite to each other, applying surface pressure to the sliding surfaces, sliding the sliding surfaces in a direction indicated with an arrow, and evaluating the amount of wear. As for the conditions for the test, the surface pressure was set at 3 MPa to 7 MPa, the amount of sliding (amplitude) was set at ±0.5 mm, the diameter of each sliding surface was set at 3 mm, and the number of slides was set at 1 million (for 6 hours).

An overlay layer was formed on the sliding surface of the upper jig A by overlaying the sliding surface with a Tribaloy T800 alloy in the shield gas using TIG welding. A welding rod of the Trobaloy T800 alloy was used as the overlay material, and an argon gas was used as the shielding gas. Wear resistant coatings of the Stellite 31 alloy were, respectively, formed on the sliding surfaces of the lower jigs B made using the forming methods of Embodiments 1 to 3. In addition, in a forming method of Comparative Example 1, a coating was formed on the sliding surface of the lower jig B by overlaying the sliding surface with the Stellite 31 alloy using TIG welding. In the forming method of Comparative Example 1, a welding rod of the Stellite 31 alloy was used as the overlay material, and an argon gas was used as the shielding gas. The film thicknesses of the respective coatings were set approximately equal to one another.

As for the test temperature, 200° C., 480° C., and 600° C. were set for the wear resistant coating formed using the forming method of Example 1, 480° C. was set for the wear resistant coating formed using the forming method of Example 2, 480° C. and 600° C. were set for the wear resistant coating formed using the forming method of Example 3, and 300° C., 480° C., 700° C., and 900° C. were set for the coating formed using the forming method of Comparative Example 1.

Figure 11:
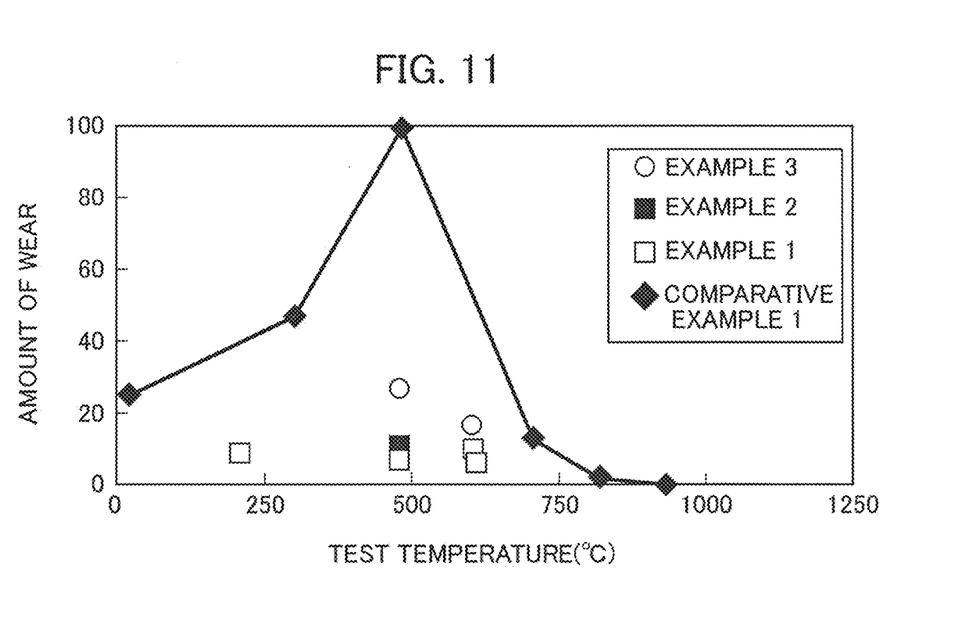
FIG. 11 is a graph showing a result of the fretting wear test in the embodiment of the present disclosure.

FIG. 11 is a graph showing a result of the fretting wear test. In the graph of FIG. 11, the horizontal axis represents the test temperature, and the vertical axis represents the amount of wear. Example 1 is indicated with white squares, Example 2 is indicated with a black square, Example 3 is indicated with white circles, and Comparative Example 1 is indicated with black diamonds.

Each amount of wear shown in the graph of FIG. 11 is calculated from the film thicknesses of before and after the wear test, and is shown as a value relative to 100 representing the amount of wear which occurred at 480° C. in the coating formed using the forming method of Comparative Example 1. For example, the amounts of wear which occurred at 480° C. and 600° C., respectively, in the wear resistant coating formed using the forming method of Example 1 were from 5 to 10 relative to 100 representing the amount of wear which occurred at 480° C. in the coating formed using the forming method of Comparative Example 1.

As for the coating formed using the forming method of Comparative Example 1, the amount of wear was large in the temperature range not higher than approximately 600° C., and was largest at 480° C. In contrast to this, as for each of the wear resistant coatings formed using the forming methods of Examples 1 to 3, the amount of wear was small in the temperature range not higher than approximately 600° C.

The forming method of Comparative Example 1 used the welding rod of the Stellite 31 alloy as the overlay material. The specific surface area of the welding rod of the Stellite 31 alloy was smaller than that of the powder of the Stellite 31 alloy, thus, the amount of oxygen adsorbed to the surface of the welding rod was smaller. Accordingly, almost no oxygen was supplied into the atmosphere during TIG welding. This made it impossible to form oxide particles in the coating. Furthermore, in the temperature range not higher than approximately 600° C., almost no chromium or silicon contained in the Stellite 31 alloy was selectively oxidized so that almost no oxide was formed. One may consider that those were the reason why the amount of wear of the coating formed using the forming method of Comparative Example 1 was larger in the temperature range not higher than approximately 600° C.

In contrast to this, the forming methods of Examples 1 to 3 each used the powder of the Stellite 31 alloy passing through 150 mesh, etc, as the overlay material. The specific surface area of the powder of the Stellite 31 alloy was larger than that of the welding rod of the Stellite 31 alloy, thus, the amount of oxygen adsorbed to the surface of the powder was larger. Hence, more oxygen was supplied into the atmosphere during TIG welding. Accordingly, the oxide particles mainly including the oxide containing chromium and silicon were dispersively formed in the wear resistant coating. One may consider that those are the reason why the amount of wear was smaller in the temperature range not higher than approximately 600° C.

Moreover, the amount of wear of each of the wear resistant coatings formed using the forming methods of Examples 1 and 2 was smaller than that of the wear resistant coating formed using the forming method of Example 3. One may consider that the reason for this is that the average hardness of the wear resistant coating formed using the forming method of Example 3 was slightly lower than those of the wear resistant coatings formed using the forming methods of Examples 1 and 2.

The present disclosure makes it possible to enhance the wear resistance even in the temperature range not higher than approximately 600° C., and is therefore useful for a gas turbine part and the like.

What is claimed is:

1. A sliding part with a wear resistant coating, comprising:
    a sliding part; and
    a wear resistant coating provided on a sliding surface of the sliding part, and made of a cobalt alloy containing chromium and silicon, wherein
    spherical oxide particles are dispersed in the wear resistant coating, the spherical oxide particles being made of an oxide which contains chromium and silicon, and having a particle size of 100 μm or less when a cross section of the wear resistant coating is observed using an optical microscope with a magnification of 100 times,
    when a 300 μm×300 μm area in the cross section of the wear resistant coating is observed using the optical microscope with the magnification of 100 times, 10 or more spherical oxide particles with a particle size of 10 μm or less are present therein, and
    the spherical oxide particles are dispersed in a surface of the wear resistant coating, and in a thickness direction of the wear resistant coating, and
    the wear resistant coating comes into direct contact with a counterpart and slides thereon.

2. The sliding part with a wear resistant coating according to claim 1, wherein
    a Vickers hardness of the wear resistant coating is HV280 or greater.

3. The sliding part with a wear resistant coating according to claim 1, wherein
    the cobalt alloy contains 8.5% by mass or more but 32.5% by mass or less of chromium.

4. The sliding part with a wear resistant coating according to claim 2, wherein
    the cobalt alloy contains 8.5% by mass or more but 32.5% by mass or less of chromium.

5. The sliding part with a wear resistant coating according to claim 1, wherein
    the sliding part is a gas turbine part.

6. The sliding part with a wear resistant coating according to claim 2, wherein
    the sliding part is a gas turbine part.

7. The sliding part with a wear resistant coating according to claim 3, wherein
    the sliding part is a gas turbine part.

8. The sliding part with a wear resistant coating according to claim 4, wherein
    the sliding part is a gas turbine part.

9. The sliding part with a wear resistant coating according to claim 1, wherein
    the cobalt alloy contains, on a mass-ratio basis, 10.5% of Ni, 2% or less of Fe, 0.5% of C, 25.5% of Cr, 1% of Mn, 1.0% of Si and 7.5% of W, and the rest were Co and inevitable impurities, and
    the spherical oxide particles are filled in voids in the wear resistant coating.

10. The sliding part with a wear resistant coating according to claim 9, wherein
    a Vickers hardness of the wear resistant coating is not less than HV280 but not greater than HV310.

* * * * *